No. 625,695.
J. T. PEIRCE.
HORSE DETACHER.
(Application filed Oct. 18, 1898.)
(No Model.)
Patented May 23, 1899.
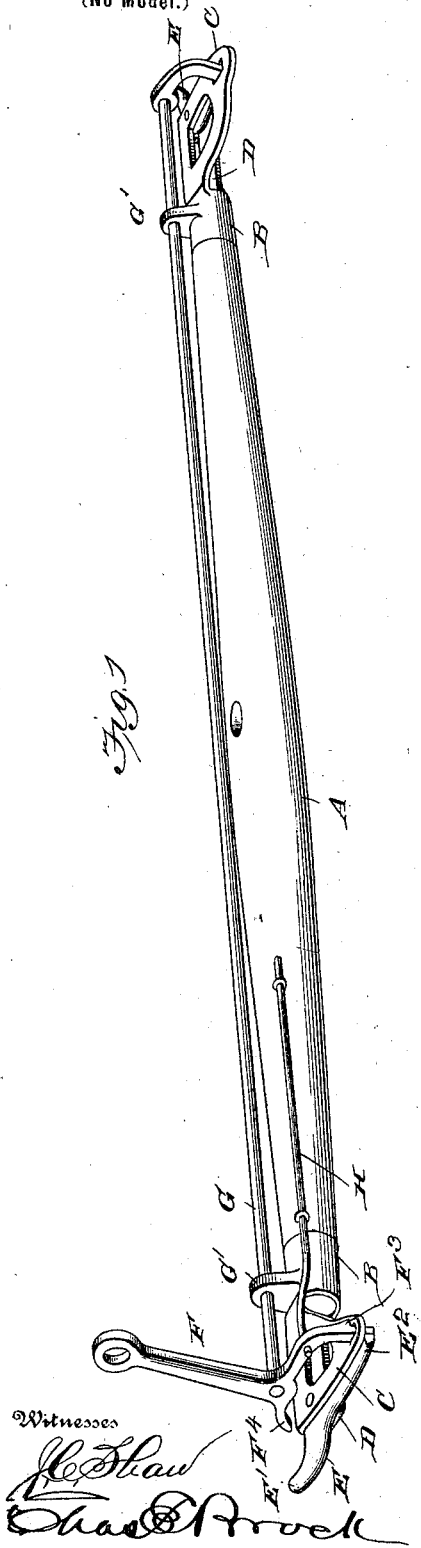
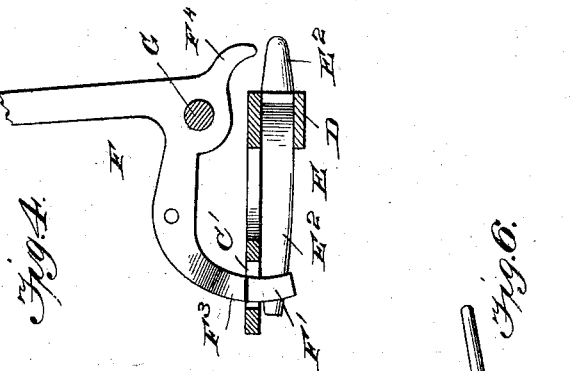
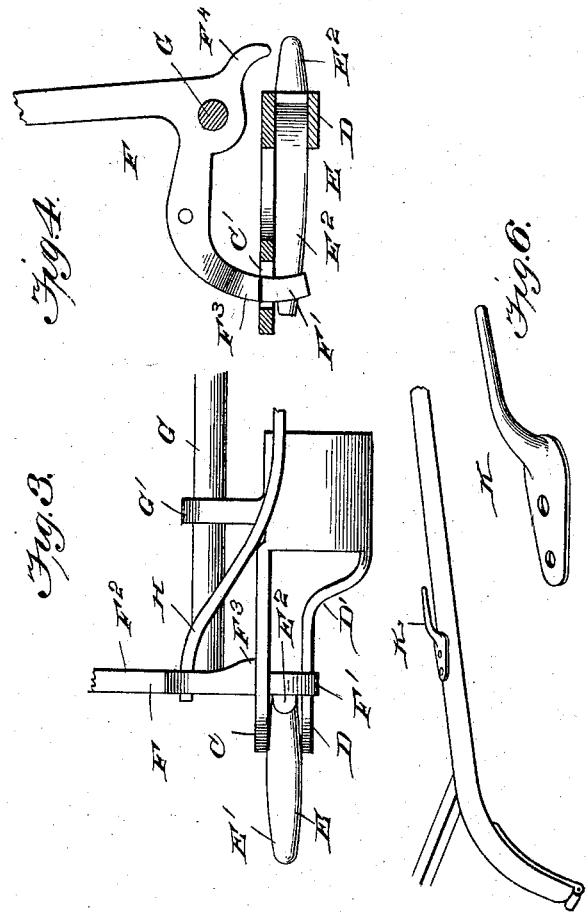
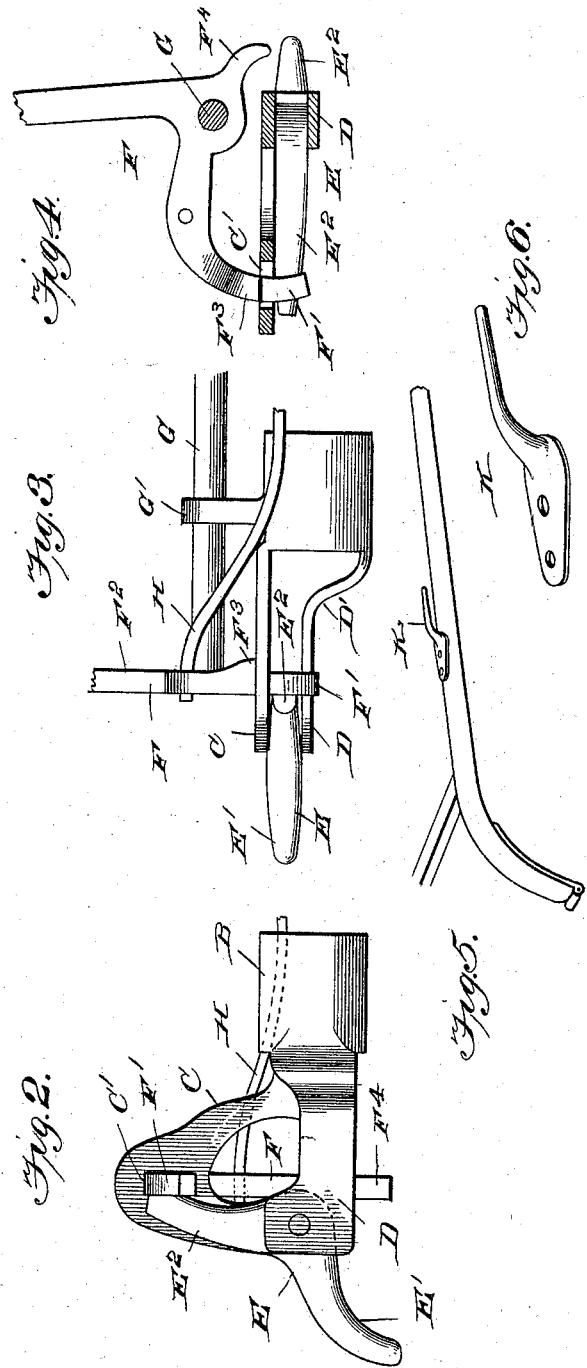
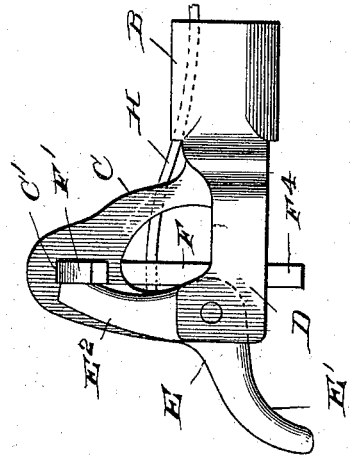
Witnesses
Inventor
J. T. Peirce,
Attorneys

UNITED STATES PATENT OFFICE.

JOHN TICHNOR PEIRCE, OF BRELAND, LOUISIANA, ASSIGNOR OF ONE-FOURTH TO ADOLPHUS E. PEIRCE, OF SAME PLACE.

HORSE-DETACHER.

SPECIFICATION forming part of Letters Patent No. 625,695, dated May 23, 1899.

Application filed October 18, 1898. Serial No. 693,886. (No model.)

*To all whom it may concern:*

Be it known that I, JOHN TICHNOR PEIRCE, a citizen of the United States, residing at Breland, in the parish of Tangipahoa, State of Louisiana, have invented a new and useful Horse-Detacher, of which the following is a specification.

This invention is a horse-detaching device adapted for use in connection with vehicles of all kinds for the purpose of releasing the horse at once whenever it becomes necessary and especially in case the horse should run away.

The object of the invention is to provide a device which is cheap and simple in construction and can be applied to vehicles now in use.

With this object in view the invention consists of the peculiar construction of the various parts and in their novel arrangement or combination, all of which will be fully described hereinafter and pointed out in the claims.

In the drawings forming a part of this specification, Figure 1 is a view of a whiffletree or singletree with my horse-detaching device applied thereto. Fig. 2 is an inverted plan view of the device on the right end of the whiffletree. Fig. 3 is a front face view of such parts. Fig. 4 is a detail, partly in section and partly in elevation. Fig. 5 is a view showing the position of the holdback, and Fig. 6 is a detail view of the holdback.

In carrying out my invention I employ an ordinary whiffletree or singletree A and fit a ferrule B upon each end, each ferrule having the plates C and D integral therewith and projecting from the outer end, the upper plate C being angular in form, while the plate D projects straight out, but is bent up, as shown at D′, and between these plates is pivoted the whiffletree-hook E, angular in form, one member, E′, being adapted for engagement by the trace, while the other, E², is intended to engage the lower end F′ of an elevated lever or catch F, mounted upon the end of a rock-shaft G, journaled above the whiffletree in bearing-lugs G′, integral with the ferrules B. The catch-lever has an upwardly-projecting arm F², which connects with an operating-lever by means of any suitable operating-rod. The forward end is enlarged, as shown at F³, to prevent passing too far down through the perforation C′ in the plate C, and it is also formed with a stop-arm F⁴ to prevent too much of a backward and upward movement of the catch-lever, said lever being normally held down by means of a spring-rod H, fastened to the whiffletree, the free end being connected with the catch-lever forward of its pivotal point.

The above description refers to the device upon the right end of the whiffletree, and the device upon the left end is of the same construction except that the catch-lever at that end has no stop and operating arms, but is carried by the same rock-shaft and operates simultaneously with the catch-lever at the right. The holdbacks K are secured upon the top sides of the shafts and project forwardly in order to permit the breech-strap to slip from the thills. In operation the forward end of the whiffletree-hook engages the forward end of catch-lever, and the rear end is positioned to receive and hold the traces, and the spring-rod will hold all the parts in their normal positions. Should it become necessary or desirable to release the horse at once, the operating-arm of the catch-lever is drawn back, and this raises the forward end, releasing the hook, which swings upon its pivot, and the traces slip from the hooks, and as the holdbacks project forwardly the horse can escape at once from the shafts. If desired, the operating-lever can also be connected to a brake-lever to apply the brakes the moment the horse is released.

Having thus fully described my invention, what I claim as new, and desire to secure by Letters Patent of the United States, is—

1. In a device of the kind described, the combination with the ferrule, having plates at the end, of a whiffletree-hook pivoted between said plates, the rock-shaft journaled upon the ferrule, the catch-lever carried by said shaft, said lever having its forward end passing through an opening in the top plate to engage the forward end of whiffletree-hook, and means for releasing the lever, substantially as shown and described.

2. In a device of the kind described, the combination with the ferrule, having plates at the end, of a whiffletree-hook pivoted between said plates, the rock-shaft journaled upon the ferrule, the catch-lever carried by said shaft, said lever having its forward end passing through an opening in the top plate to engage the forward end of whiffletree-hook, a stop near the forward end of lever and a stop-arm at the rear end, the operating-arm and the spring-rod, all arranged and adapted to operate, substantially as shown and described.

JOHN TICHNOR PEIRCE.

Witnesses:
B. G. PAINTER,
W. W. FUSSELL.